A. ASPER.
MACHINE FOR GATHERING AND HUSKING CORN.
APPLICATION FILED JULY 12, 1909.
1,056,727.
Patented Mar. 18, 1913.
6 SHEETS—SHEET 4.
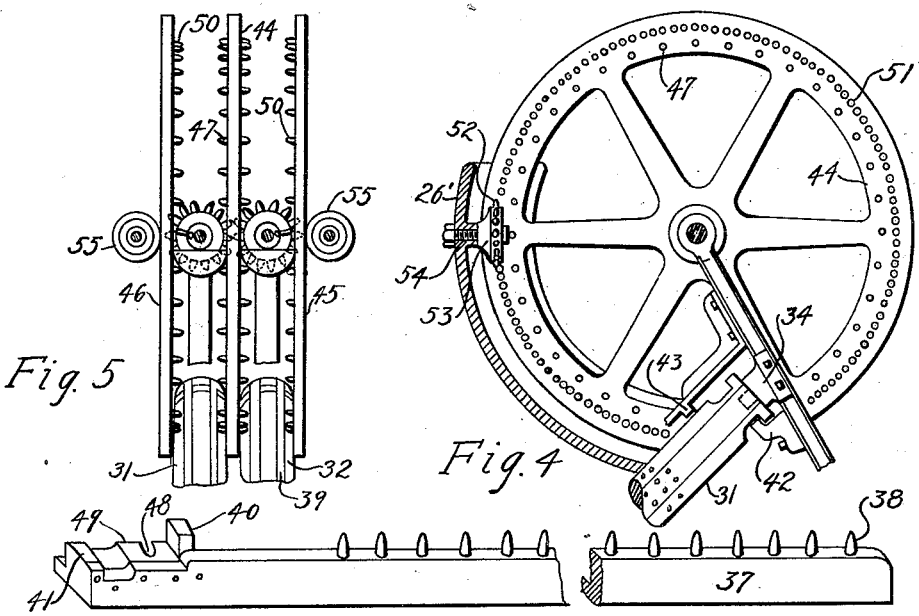
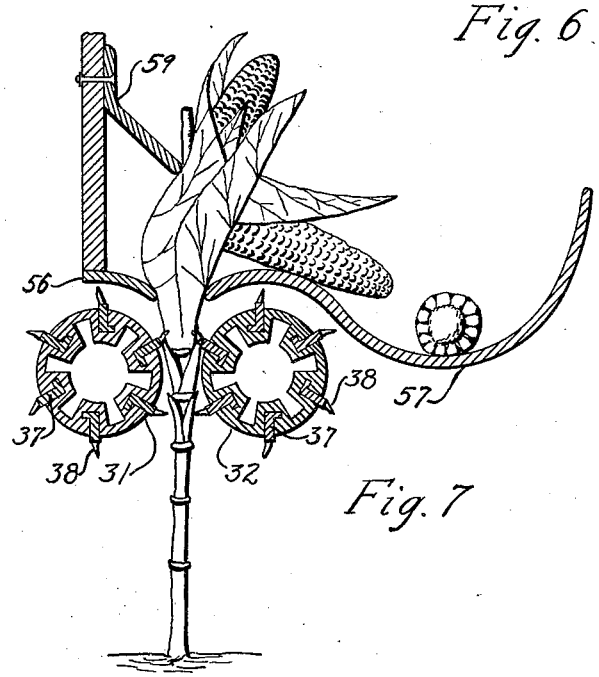
WITNESSES:
R. B. Worlitsek
J. Jessen
INVENTOR.
ALBERT ASPER
BY Paul & Paul
ATTORNEYS A. ASPER.
MACHINE FOR GATHERING AND HUSKING CORN.
APPLICATION FILED JULY 12, 1909.

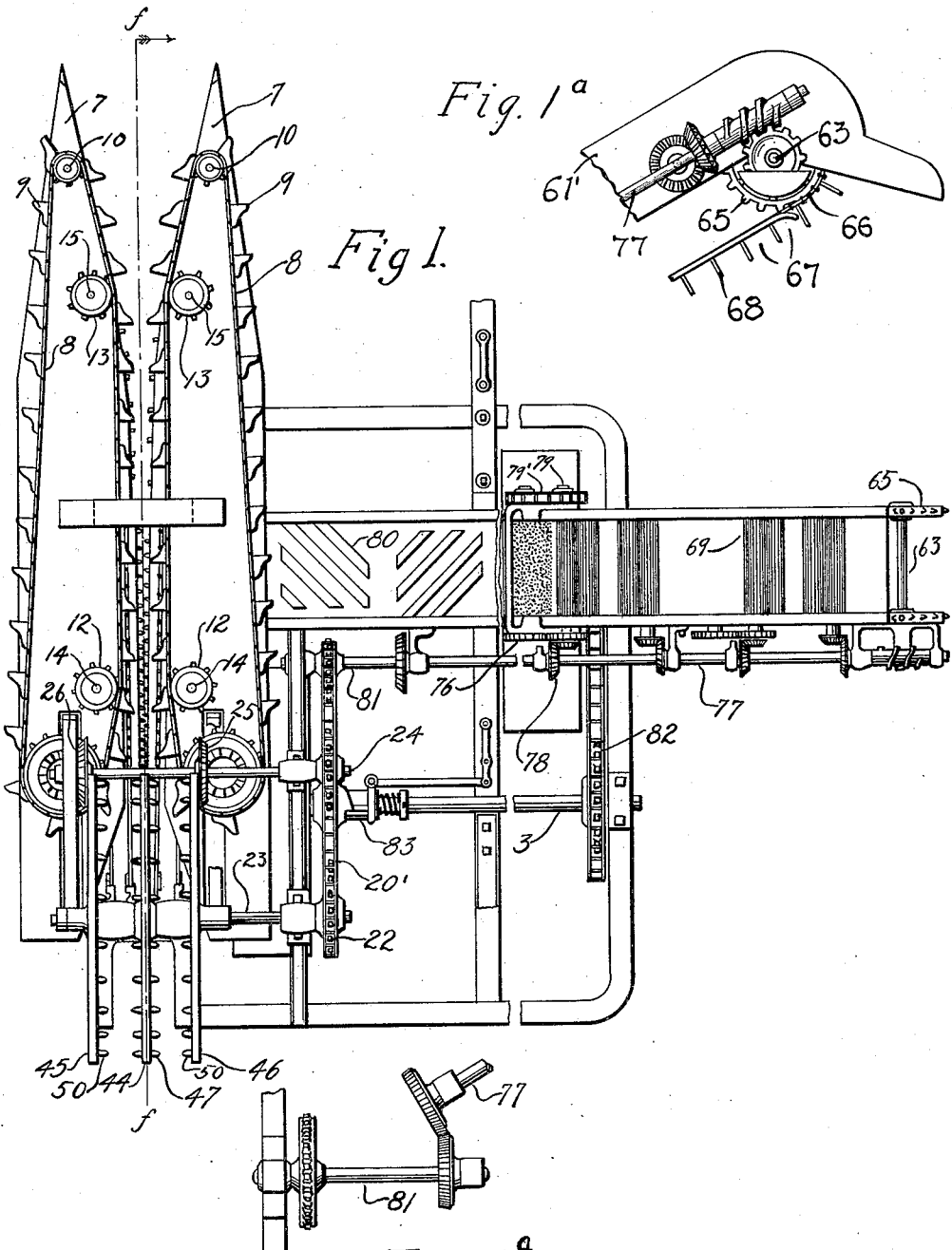

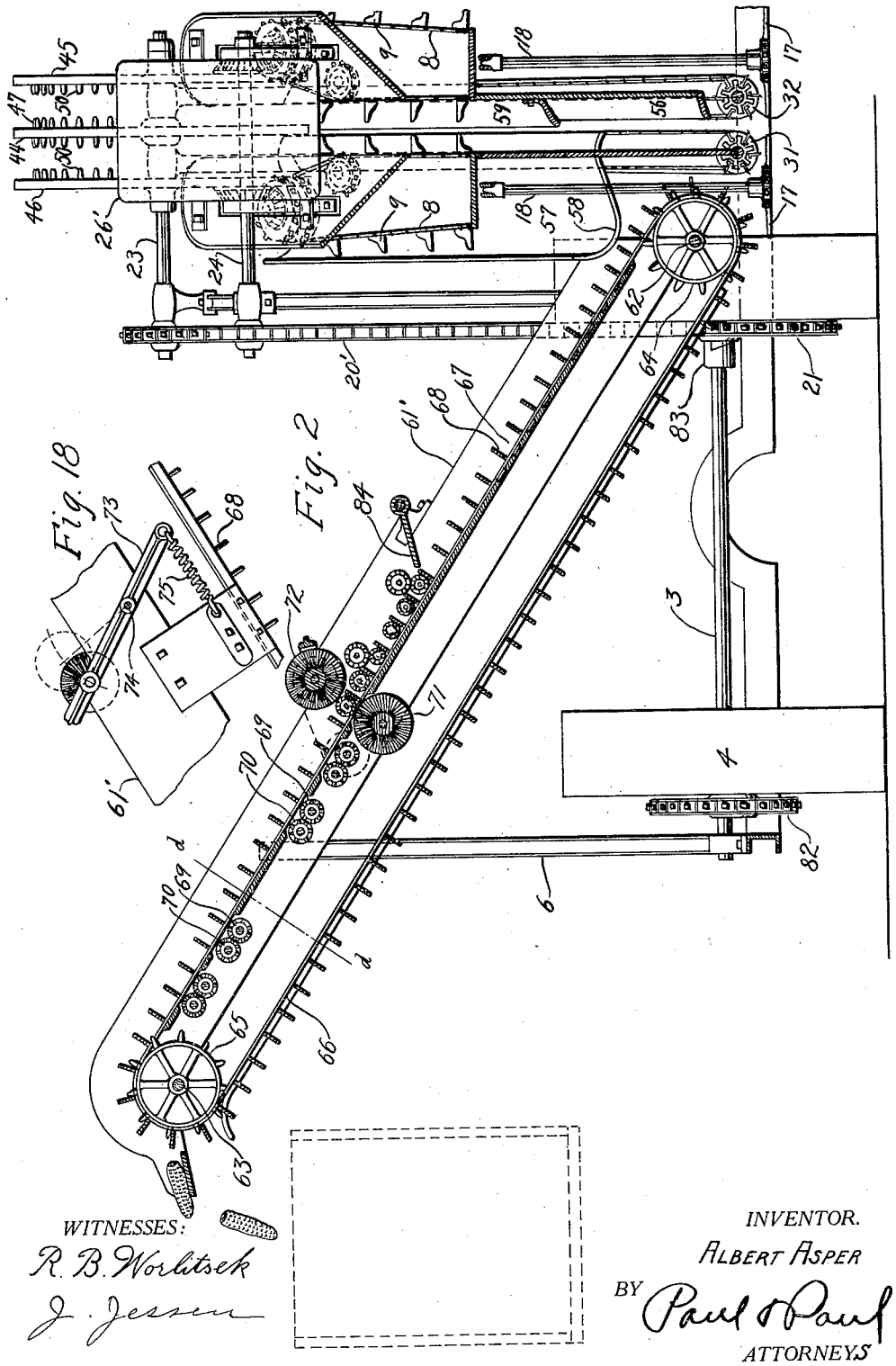

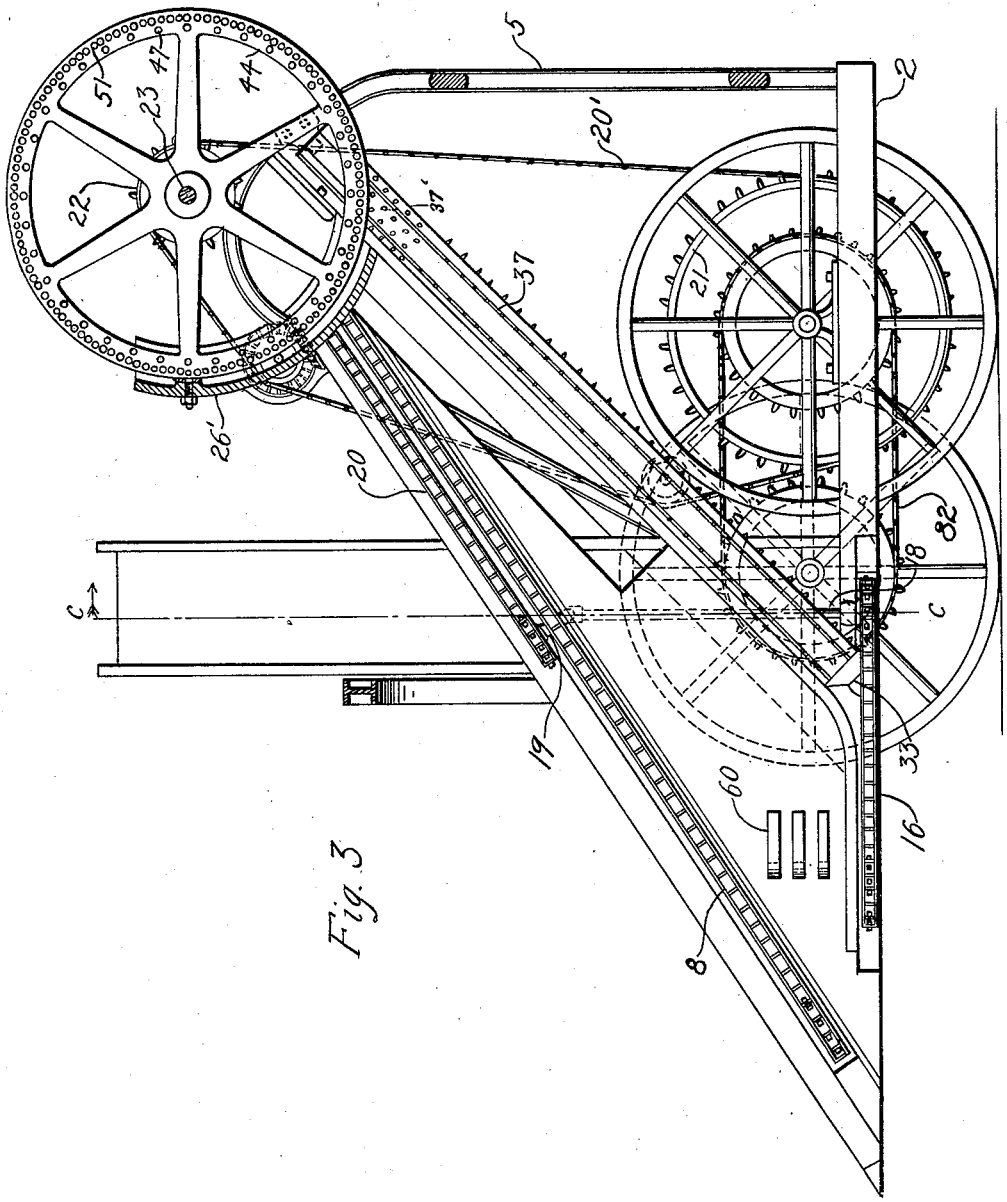

1,056,727.

Patented Mar. 18, 1913.
6 SHEETS—SHEET 5.

WITNESSES:
R. B. Worlitsek
J. Jessen

INVENTOR.
ALBERT ASPER
BY Paul & Paul
ATTORNEYS

A. ASPER.
MACHINE FOR GATHERING AND HUSKING CORN.
APPLICATION FILED JULY 12, 1909.
1,056,727.
Patented Mar. 18, 1913.
6 SHEETS—SHEET 6.
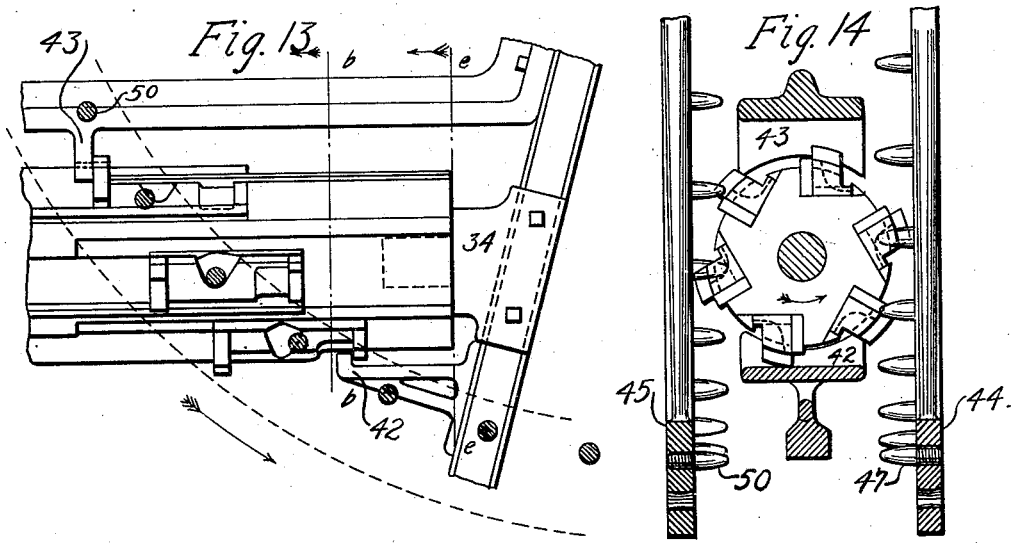
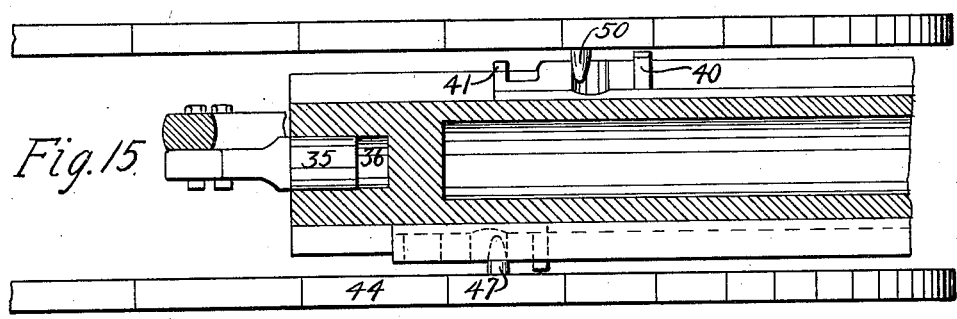
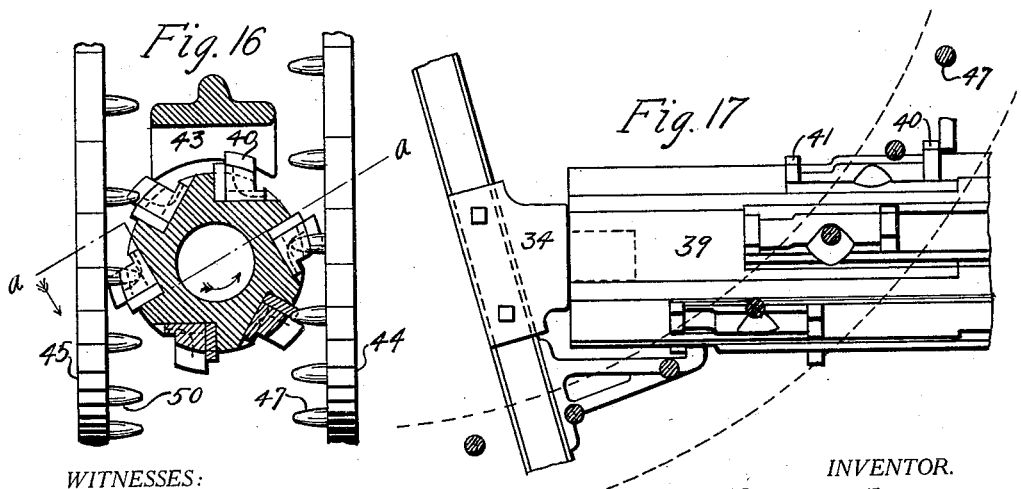
WITNESSES:
R. B. Worlitzek
J. Jessen
INVENTOR.
ALBERT ASPER
BY
Paul & Paul
ATTORNEYS

UNITED STATES PATENT OFFICE.

ALBERT ASPER, OF SEDGEWICK, ALBERTA, CANADA, ASSIGNOR TO ADOLPH P. GUBRUD, OF HUDSON, SOUTH DAKOTA.

MACHINE FOR GATHERING AND HUSKING CORN.

1,056,727.   Specification of Letters Patent.   Patented Mar. 18, 1913.

Application filed July 12, 1909. Serial No. 507,131.

*To all whom it may concern:*

Be it known that I, ALBERT ASPER, a citizen of the Dominion of Canada, and a resident of Sedgewick, Province of Alberta, Dominion of Canada, have invented certain new and useful Improvements in Machines for Gathering and Husking Corn, of which the following is a specification.

The object of my invention is to simplify and improve a machine for a similar purpose and described in my U. S. Patent No. 717,153, issued to me December 30th, 1902.

A further object is to provide a machine, in which rapidly moving parts have been eliminated.

A further object is to provide a machine of simple construction and one which will be very efficient for the purpose designed.

My invention consists generally in a stripping roller having teeth mounted to revolve therewith and also movable lengthwise of said roller, and means coöperating with said roller to strip the stalks.

Further, the invention consists in various constructions and combinations, all as hereinafter described and particularly pointed out in the claims.

Figure 12:
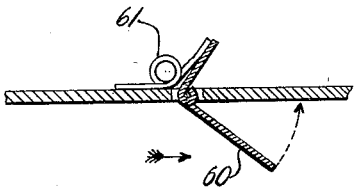
Figure 8:
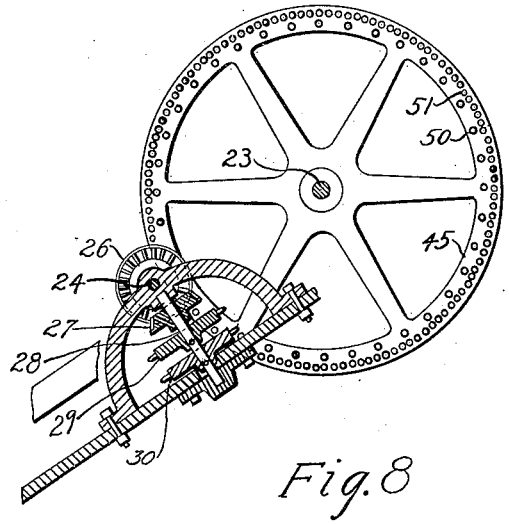
Figure 11:
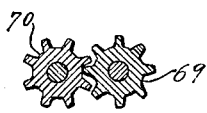
Figure 9:
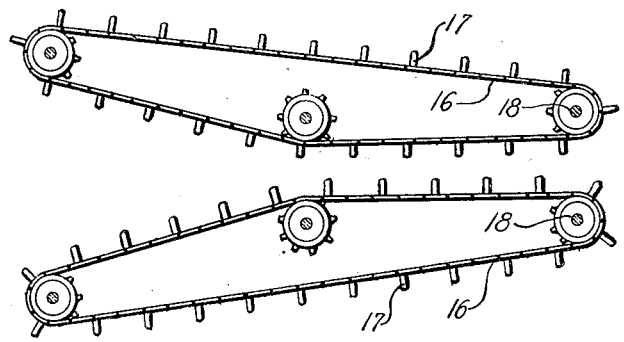
Figure 10:
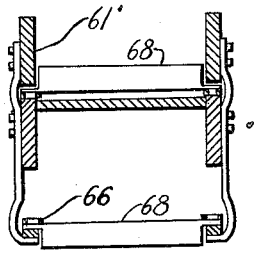

In the accompanying drawings, forming part of this specification, Figure 1 is a plan view of a gathering and husking machine, embodying my invention, Fig. 1ᵃ is a detail view, showing the mechanism at the upper end of the elevator, including the worm gear with the oil trough. Fig. 2 is a sectional view on the line C—C of Fig. 3, Fig. 3 is a sectional view on the line f—f of Fig. 1, Fig. 4 is a detail view, showing the mechanism for driving the rollers, Fig. 5 is an edge view of the roller-driving wheels, Fig. 6 is a detail view of one of the sliding bars mounted in the rollers, Fig. 7 is a transverse, sectional view of the rollers, showing the mechanism in the act of removing an ear of corn from the stalk, Fig. 8 is a detail view showing the mechanism for driving the feeding chains, Fig. 8ᵃ is a detail view, illustrating the driving connection for the elevator carrier shaft, Fig. 9 is a plan view of the lower feeding chains or belts, Fig. 10 is a sectional view on the line d—d of Fig. 2, Fig. 11 is a transverse, sectional view through the rollers arranged beneath the conveyer, Fig. 12 is a detail sectional view of one of the gate devices arranged to project into the path of the stalks and prevent the ears from escaping when there are no stalks entering the machine, Fig. 13 is a detail view, illustrating the manner of operating the sliding bars in the rollers, Fig. 14 is a sectional view on the line e—e of Fig. 13, Fig. 15 is a sectional view on the line a—a of Fig. 16, Fig. 16 is a sectional view on the line b—b of Fig. 13, Fig. 17 is a detail sectional view, also illustrating the manner of operating the reciprocating bars, which are mounted in the gathering rollers, Fig. 18 is a detail view, illustrating the manner of yieldingly supporting the upper brush on the elevator frame.

In the drawing, 2 represents the frame of a machine, having an axle 3 and carrying wheels 4. Standards 5 and 6 are mounted on said frame and support the operating mechanism of the machine. At one side of the machine the gathering devices are located and consist of plates or boards 7 arranged parallel with each other and having their edges for a greater portion of their length spaced apart, thereby forming a narrow slot or space of sufficient width to receive a single row of corn. The lower ends of the plates are beveled and outwardly inclined and are also arranged upon an incline, substantially as shown in my patent above referred to.

On each side of the opening between the plates, I provide carrier belts 8 having fingers 9 mounted thereon and passing around shafts 10 and inclined shafts 28 and engaging with sprocket wheels 12 and 13 on intermediate shafts 14 and 15. These belts are substantially the same as those described in my former patent and do not require detailed description or illustration herein. The carrier belts are arranged at an incline corresponding to that of the plates 7 and beneath them horizontal belts 16 are arranged having fingers 17 and passing around shafts 18 and driven therefrom through stub shafts 19, which have universal joint connections with the shafts 18 and are driven by a belt 20 arranged above and parallel with the belts 8. The driving belt 20′ connects a sprocket wheel 21, secured to one of the carrying wheels, with a sprocket wheel 22, mounted on a shaft 23, that is journaled in standards 5. The driving belt also engages a sprocket wheel on a shaft 24, whereon beveled gear wheels 25 and 26 are mounted and mesh with beveled gear pinions 27 secured on the shafts 28, which carry sprocket wheels 29 and 30, around which the belts 8 and 20 pass respectively and through which said belts are driven. A guard plate 26' is provided, as shown in Fig. 3, to protect the gear mechanism from the entrance of husks and silk therein. These belts receive the corn stalks and hold them in an upright position during the operation of snapping the ears from the stalk. In the rear of the upper carrier belts, I arrange inclined rollers 31 and 32 having bearings at 33 in the frame 2, and at the upper end brackets 34 are provided, having studs 35 thereon, which fit within sockets 36 in the ends of the rollers, these sockets serving to retain the oil and keeping the studs thoroughly lubricated. Mounted in the periphery of the rollers are a series of longitudinally sliding bars 37. In these bars I arrange a series of pins or teeth 38. The bars are adapted to slide back and forth in longitudinal grooves 39 provided in the rollers, and 40 and 41 are lugs arranged on one end of each bar in position to be engaged by cams 42 and 43, to hold the bars in position while they pass from one drive wheel to the other, as will hereinafter appear. The drive wheels 44, 45 and 46 are mounted on the shaft 23. These teeth, revolving with the stripping rollers and movable lengthwise thereof, I regard as an important feature of my invention. I have shown an operative method of mounting these teeth in the rollers to obtain the desired movement, but do not wish to confine myself to this construction as it is capable of various modifications. I have found that satisfactory results may be obtained if only one stripping roller is equipped with these teeth. The middle drive wheel 44 is secured on this shaft and the other two wheels 45 and 46 are loose. The middle wheel has a series of pins 47 on each face thereof near its periphery. The pins 47 in the wheel 44 enter recesses 48 in blocks 49 in the bars 37 and cause a rotary motion to the rollers and a forward and downward motion to the bars. The pins 50 provided in the wheels 45 and 46 cause an upward motion to the rollers and an upward and rearward movement to the bars, the operation of all of the wheels revolving the rollers and imparting a reciprocating movement to the bars. As before stated, the middle drive wheel 44 is positively driven and the outer loosely-mounted wheels have a series of holes 51 therein near their peripheries, which are adapted to receive pins 52 provided on wheels 53, which are mounted on studs 54 at right angles substantially to the plane of the wheels and are driven by the engagement of the pins with the holes in the center driving wheel 44. The wheels 45 and 46 are held in engagement with the wheels 53 by means of smooth pressure rollers 55, which are arranged to bear on the outer peripheral faces of said wheels. This driving means for the sliding bars and the teeth may be simplified in various ways and is only shown herein as a means for effecting the desired movement of the rollers and bars.

Figs. 13 to 17 illustrate clearly in detail the manner of mounting the rollers and the operation of the drive wheels and the engagement of the pins with the sliding bars for the purpose of reciprocating them back and forth in the rollers, as the rollers are revolved. It will be evident from an examination of these figures, that as the drive wheels are positively driven and their pins engage the sliding bars, that a combined rotary movement will be imparted to the rollers and a reciprocating longitudinal movement to the bars. The lower ends of the rollers are beneath the upper gathering belts and are spaced apart sufficiently to receive the upright stalks of corn between them, as indicated in Fig. 7, and being arranged at an incline, some portion of the reciprocating bars and their pins will be on the same level as the ears of corn on the stalks and the pins mounted in the bars engaging the ears will impart a twisting, pulling movement thereto and snap them off the stalk, as indicated in Fig. 7. Above the reciprocating bars and their rollers, I arrange a plate 56, curved to correspond to the curve of the rollers, and a trough 57 spaced from the plate sufficiently to receive the ears of corn, the trough being curved in cross section and having a discharge 58 into the elevating carrier, as will hereinafter appear. A guard plate 59 is arranged above the plate 56 and engages the ear and forces it over toward the trough at an angle to the stalk. A bending strain is thus obtained on the ear, instead of a straight pull or tension strain. In front of the rollers, gates 60 are provided, having springs 61, which hold them out into the path of the stalks and prevent the ears from escaping when there are no stalks entering the machine. I have shown a series of these gates, one above another, but as many of them may be provided as are found necessary in the operation of the machine. See Fig. 12. As shown in Fig. 3, the gates are located near the receiving ends of the husking rollers so that when the ears are delivered to these rollers the gates will prevent the ears from working forward out of the machine in case the feeding of the stalks to the machine is temporarily arrested.

A wagon elevator frame 61 is arranged at an incline supported by the frame 2 and the standards 6 and has shafts 62 and 63 journaled therein, carrying sprocket wheels 64 and 65. Belts 66 connect these wheels and are provided with a series of pockets 67 formed by blades 68 mounted on the belts a sufficient distance apart to allow a single ear of corn to be dropped down between them, but too near together to permit the entrance of two ears of corn into a single pocket. Pairs of rollers 69 and 70 are provided, having corrugated peripheries arranged to mesh with one another and brushes 71 and 72 are arranged above and below the conveyer respectively in position to engage the ears of corn as they pass between them. The upper brush 72 is carried by a frame 73, which is pivoted at 74 on the shaft of the roller 69. A spring 75 is provided to counter-balance the weight of the upper brush and can be adjusted to regulate the pressure of this brush on the ears of corn. The brushes revolving in opposite directions and operating at slightly unequal speeds will have a tendency to loosen up the husks and remove the silk from the ears as they pass between them in the pockets. The contiguous roller 69 is driven through the gear 78 and the shaft 79 and as heretofore stated, the upper brush is driven through the gear 76, while the lower brush has a belt connection 79' with the shaft of the roller 69. Both brushes will thus be positively driven, the upper one being capable of rising and falling or moving toward or from the ears of corn to accommodate itself to the variation in size of the ears.

80 represents a series of channels provided diagonally in the bottom of the carrier and serving to cause up-turned or jammed ears of corn to drop flatwise into the pockets of the conveyer belt.

The drive chain 20' engages a sprocket wheel on a stub shaft 81, which is geared to drive the shaft 77 of the elevator, as indicated in Fig. 8ª. The axle 3 has a driving connection 82 with the carrying wheel 4 and a clutch device 83 on said axle allows the operator control over the gathering mechanism to render it operative or inoperative, as desired. This driving connection with both wheels utilizes the full traction power of the machine. An apron 84 is arranged below the brushes, in position to prevent the ears that will sometimes be brushed back, from being cocked up and rolling back to the foot of the elevator and holding them until empty pockets come along, into which the ears may fall.

In the operation of the machine, the corn stalks pass between the gathering belts as the machine moves along and the stems of the ears are engaged by the pins carried by the reciprocating bars, which, as heretofore described, have a longitudinal movement in the grooves of the rollers and a rotary movement with the rollers. Thus, when the pins engage the ears, a rotary twist will be imparted thereto to snap the ear stems and release the ear from the stalk. This is indicated plainly in Fig. 7. The ear will be tilted at an angle to the stalk by the engagement with the edge of the plate 59 and as the ears fall into the curved plate or trough, they will slide down upon the elevator and be guided into the transverse pockets thereof. The passage of the ears between the upper and lower brushes will cause the removal of the husks and silk, while any particles that may be adhering to the ears after leaving the brushes, will be jerked off by the pairs of revolving rollers. The engagement of the pins of the driving wheels with the bars in the rollers will have the effect of revolving the rollers and at the same time, imparting a longitudinal reciprocating movement to the bars. This continuous movement of the rollers and bars is made possible by the arrangement of the pin wheels on opposite sides thereof.

37' represents pins fixed in the upper ends of the rollers 32 and adapted to engage and feed down such portions of the stalks as project above the upper ends of the rollers. It will be evident that if the tops of these stalks are not fed downwardly, they will soon accumulate and clog the machine. The belts 16 with the projecting pins thereon, tend to spread a bunch of the stalks in a single row and may be, if preferred, operated at an unequal speed, so that one belt at times will have a retarding effect. This is substantially as shown in my former patent, above referred to.

I do not wish to confine myself to the number of brushes and corrugated rollers employed in connection with the elevating carrier, as the number may be increased as the condition of the corn and the removal of the husks and silk may make necessary.

I claim as my invention:—

1. The combination, with the inclined gather plates arranged with a narrow space between them, of means including rollers and pins thereon, said pins having a rotary movement with said rollers and a movement longitudinally of the rollers, for the purpose specified.

2. The combination, with the inclined gather plates having a narrow space between them adapted to receive a corn stalk, of inclined rollers, and means slidably mounted in the peripheries of said rollers and adapted to engage the stems of the ears, and means for revolving said rollers.

3. The combination, with the inclined gather plates having a space between them, of inclined rollers, reciprocating bars mounted in said rollers and having means arranged to engage the stalks and stems of the ears, and means for revolving said rollers and simultaneously imparting a reciprocating movement to said bars.

4. The combination, with the inclined gather plates having a space between them, of revolving rollers having means in their periphery adapted to engage the stalks and stems of the ears, a shaft, a drive wheel fixed thereon, loose drive wheels also mounted on said shaft and having means to engage and revolve said rollers, and said loose drive wheels having driving connections with said fixed drive wheel.

5. The combination, with the inclined rollers, of reciprocating bars mounted therein, pins carried by said bars and adapted to engage the stalks and stems of the ears of corn, and drive wheels having pins arranged to engage said bars and impart a reciprocating movement thereto and a rotary movement to said rollers.

6. The combination, with the inclined rollers having a space between them to receive a corn stalk, of plates provided above said rollers, means slidably mounted in said rollers and adapted to engage the stems of the ears and exert a twisting force thereon, and means for revolving said rollers.

7. The combination, with the inclined gather plates having a narrow space between them adapted to receive a corn stalk, of inclined rollers, means mounted in the peripheries of said rollers and adapted to engage the stems of the ears, a middle drive wheel through which said rollers are rotated, and outer drive wheels operatively connected with said stem engaging means.

8. The combination, with the inclined gather plates having a narrow space between them adapted to receive a corn stalk, of inclined rollers, means mounted in the peripheries of said rollers and movable lengthwise thereof, a drive wheel for said rollers and wheels having a driving connection with said lengthwise moving means.

9. The combination, with the inclined gather plates having a narrow space between them adapted to receive a corn stalk, of inclined rollers, means slidably mounted in the peripheries of said rollers and adapted to engage the stems of the ears, and a revolving means for engaging and actuating said stem engaging means.

10. The combination, with the inclined gather plates, of stripping rollers, means mounted in the peripheries of said rollers and movable lengthwise thereof and adapted to engage the stems of the ears, means for driving said rollers, wheels having means to engage said stem engaging means for actuating the same and means for operating said wheels and rollers.

11. The combination, with the inclined gather plates, of revolving rolls and pins mounted in the peripheries of said rolls and revolving therewith and having a movement lengthwise of said rolls.

12. In a machine of the class described, inclined rollers and means for operating the same, pins carried by said rollers and movable lengthwise thereof, and a plate having its edge contiguous to said rollers, for the purpose specified.

13. The combination, with the inclined revolving rollers and the teeth carried thereby, said teeth having a rotary movement with said rollers and a movement lengthwise of said rollers, a plate curved to correspond to the curve of said rollers and contiguous thereto, and a trough located near said plate.

14. The combination, with the rotary rollers, of bars slidably mounted therein, lugs carried by said bars, cams arranged to engage said lugs and a driving means for said rollers.

15. The combination, with the revolving inclined rollers, and bars slidably mounted therein and pins carried by said bars and lugs mounted on said bars, of drive wheels having means to engage said pins and cams arranged to engage said lugs and hold said bars at a predetermined point in the rotary movement of said rollers.

16. In a machine of the class described, the combination, with a corn stalk gathering means, of inclined rollers having their lower ends beneath said gathering means, said rollers being spaced apart, means mounted in said rollers and movable lengthwise thereof and adapted to engage the ears, and means for operating said rollers and said ear engaging means.

17. The combination, with the inclined rollers and the ear stem engaging means mounted therein, of a curved plate contiguous to said rollers, a trough between which and said curved plate the stalks are fed and a guard plate located above said curved plate in position to engage an ear and force it toward said trough.

18. The combination, with a corn stalk gathering means, of inclined rollers, ear engaging means mounted in the peripheries of said rollers, plates arranged above said rollers and spaced apart, between which plates the stalks are fed, and a guard arranged above one of said first named plates and operating to bend the ear toward the other of said plates, and means for operating said rollers and said ear engaging means.

19. The combination, with a corn stalk gathering means, of revolving rollers arranged to receive the stalks from said means, and teeth mounted in the periphery of said rollers to revolve therewith and capable of movement lengthwise of said rollers, for the purpose specified.

20. In a machine of the class described, stripping rollers and means for operating the same, said rollers having teeth mounted in the periphery thereof to revolve therewith, said teeth being movable lengthwise of said rollers, for the purpose specified.

21. In a machine of the class described, the combination, with a corn stalk gathering means, of revolving stripping rollers, teeth mounted in said rollers and revolving therewith and movable lengthwise thereof, and spring actuated gates located near and in front of said rollers, for the purpose specified.

22. In a machine of the class described, a stripping roller and means for operating the same, said roller having teeth mounted in the periphery thereof to revolve therewith, said teeth being movable lengthwise of said roller, and means coöperating with said roller to strip the stalks.

23. The combination, with a corn stalk gathering means, of a revolving roller, teeth mounted in the periphery of said roller to revolve therewith and capable of movement lengthwise of said roller, and means including a second roller coöperating with said teeth to strip the stalks.

24. In a machine of the class described, a stripping roller and means for operating the same, means mounted in the periphery of said roller to revolve therewith, said means being movable lengthwise of said roller, and means coöperating with said movable means to strip the stalks.

In witness whereof, I have hereunto set my hand this 19th day of June 1909.

ALBERT ASPER.

Witnesses:
D. C. BAYNE,
O. A. LYMAN.

Copies of this patent may be obtained for five cents each, by addressing the "Commissioner of Patents, Washington, D. C."